Dec. 22, 1964  D. M. PHILLIPS  3,162,720
VENTED POLE RISER SHIELD
Filed Aug. 15, 1962  2 Sheets-Sheet 1
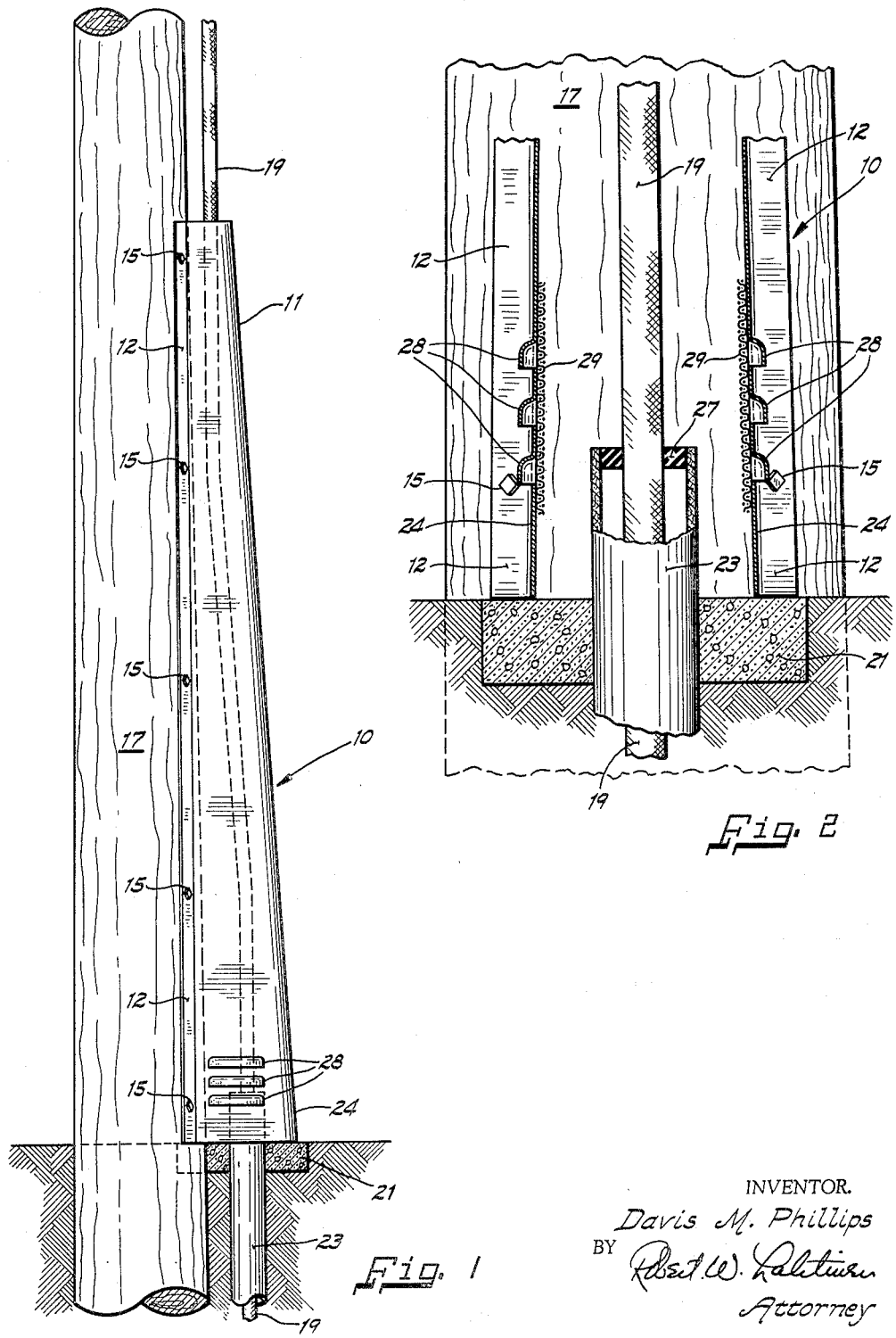
INVENTOR.
Davis M. Phillips
BY
Robert W. Fahituru
Attorney Dec. 22, 1964 D. M. PHILLIPS 3,162,720
VENTED POLE RISER SHIELD
Filed Aug. 15, 1962 2 Sheets-Sheet 2

INVENTOR.
Davis M. Phillips
BY
Attorney

United States Patent Office 3,162,720
Patented Dec. 22, 1964

3,162,720
VENTED POLE RISER SHIELD
Davis M. Phillips, South Milwaukee, Wis., assignor to McGraw-Edison Company, Milwaukee, Wis., a corporation of Delaware
Filed Aug. 15, 1962, Ser. No. 217,081
1 Claim. (Cl. 174—45)

This invention relates to protective devices for electrical conductors and more particularly to an improved pole riser shield.

In the construction of electric distribution lines it is often necessary to change from overhead to underground construction at some point along the right of way which may be occasioned by lack of overhead right of way, local codes, or the necessity of connecting to operating equipment. At these locations it is common practice to dead end the overhead line and continue the circuit down the pole and into an underground duct using insulated conductors. Should this pole be accessible to the public or along a thoroughfare, it is essential that mechanical protection be provided the insulated conductor as it approaches the ground to prevent its being damaged. This protection is usually obtained by placing a channel shaped member over the conductor and securing it to the pole. While this means of protection may be adequate for lightly loaded lines, experience has shown this method to be less than satisfactory when used with heavily loaded circuits where the temperature rise within the guard is sufficient to cause loss of insulation life.

The pole riser of the present invention overcomes this difficulty by providing for ventilation about the conductor within the riser. The path for air circulation is completed by the provision of vents in the lower portion of the riser that not only provide free opening but also are inconspicuous to passers by and resist clogging by wind blown debris.

It is an object of this invention to provide a pole riser shield for use with heavily loaded electrical conductors which will not impair the useful life of the conductor insulation.

It is also an object of this invention to provide a pole riser shield that affords cooling for the protected conductor without exposing the conductor to damage or creating a hazard.

These and other objects and advantages of this invention will become apparent from the following description taken in connection with the accompanying drawings, wherein:

FIGURE 1 is an elevation of the pole riser shield attached to a pole, with the pole and the associated conductor partially broken away and partially in phantom view;

FIGURE 2 is a section taken along line II—II of FIGURE 3 with the underground conduit partly broken away;

Figure 4:
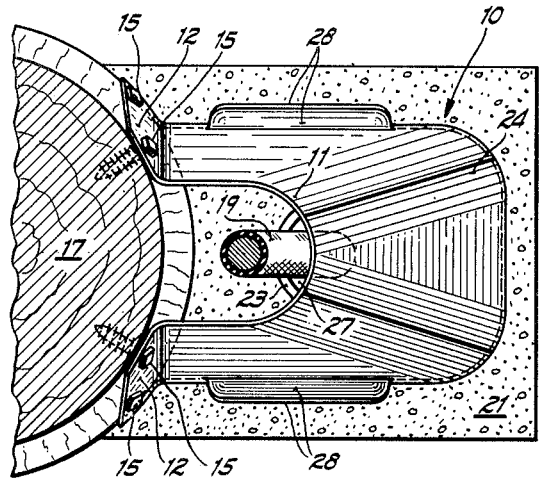
FIGURE 4 is a plan view of the pole riser shield with the associated pole partly broken away and in section and intermediate connecting bolts omitted.
Figure 3:
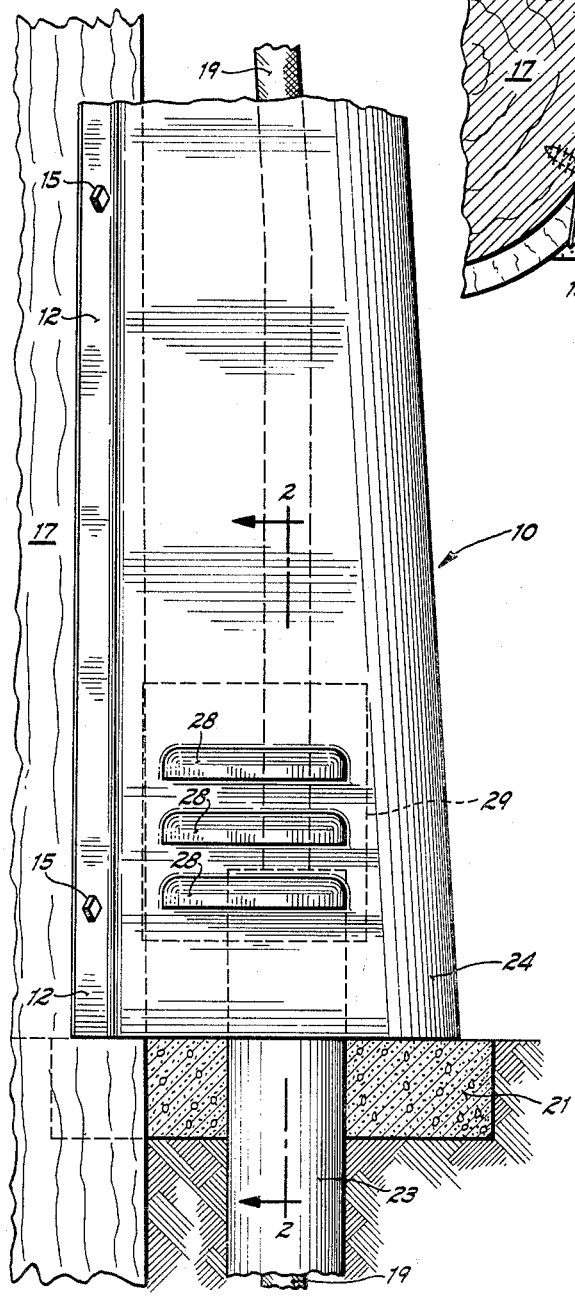
FIGURE 3 is an enlarged elevation of the lower portion of the pole riser shield.

Referring to FIGURE 1 the pole riser shield 10 has an upwardly tapering longitudinal trough shaped section 11 with flanges 12 (FIG. 4) extending along the marginal edges thereof. These flanges are provided with openings which are adapted to accommodate the lag bolts 15 to effect fastening of the shield 10 to the pole 17.

An electrical conductor 19, which may be a single unit as shown or a plurality of strands, extends vertically along the pole 17 and within the shield 10. The shield abuts a concrete footing 21 to provide a positive and complete enclosure of the conductor in the readily accessible above ground area. This footing 21 also positions and protects the terminal end portion 23 of the underground conduit within the lower portion 24 of the shield 10. A water tight seal 27 (FIG. 2) is provided about the conductor 19 as it enters the conduit 23 to prevent the entry of moisture or other undesirable foreign material into the conduit. The conductor 19 is dead ended and supported (not shown) at the top of the pole 17 to provide support for the vertically disposed portion. Thus, it is unnecessary to secure the conductor to the pole to provide support, but when multiple strand conductors are present, straps are often used to more positively orient the plurality of conductors with respect to the pole.

Neither the conduit 23 nor the conductor 19 completely fill the passageway formed by the shield 10, and the pole 17 thereby providing an upwardly extending passageway communicating with the opening at the upper end of the shield. A series of downwardly facing louvers 28 stamped from the material of the side walls of the lower trough portion 24 provide the free opening which completes a path for convective air circulation within the shield 10.

Overlying the open areas created by the presence of the louvers 28 are sections of screening 29 which restrict access through the openings and also prevent wind blown debris from entering and clogging the passageway. The screen portions 29 are secured to the inner surface of the shield portion 24 by spot welding.

In use the shield 10 is attached to the pole 17 with the lowermost edge abutting the footing 21 or otherwise contacting the adjoining structure to preclude the possibility of contacting the conductor either by accident or design to thereby prevent damage to the conductor or hazard to a passerby. The louvered and screened openings in the lower portion of the shield are inconspicuous and yet afford a complete path for air to travel upwardly within the passageway delivered by the shield and pole to connectively cool the conductor within the confines of such shield. The presence of heat within the passageway causing an elevation of the temperature above the ambient temperature surrounding the shield causes a natural upward circulation of air to occur within the passageway.

Although but one embodiment has been shown and described, it will be apparent that various changes and modifications may be made therein without departing from the spirit of the invention or from the scope of the appended claim.

I claim:

In combination with a pole, a rigid footing adjoining said pole with a conductor carrying conduit extending therethrough and an insulated conductor extending from said conduit vertically adjacent the surface of such pole, a pole riser shield comprising: an upwardly tapering one piece trough shaped member formed of sheet material and having marginal flanges along the longitudinal edges thereof to accommodate fastening devices with which said member is secured to said pole to thereby define a passageway with said pole surrounding said conductor, said member having a lower edge surface abutting said footing and cooperating with the surface of said pole to surround said conduit vertically extending portion, said passageway being of substantially greater cross section than said conductor throughout the length of said trough, louvers struck from the material of said member to form downwardly facing openings in a lower portion of said member affording vent means whereby an air path is provided for convective cooling of said conductor in said passageway and a perforate covering secured to the interior surface of said member and overlying said louver openings.

References Cited in the file of this patent

UNITED STATES PATENTS

| | | |
|---|---|---|
| 2,080,913 | Hafecost et al. | May 18, 1937 |
| 2,230,734 | Van Antwerp | Feb. 4, 1941 |
| 2,859,270 | Patchin | Nov. 4, 1958 |
| 2,938,941 | Roberts | May 31, 1960 |